United States Patent [19]
Ghil

[11] Patent Number: 5,833,579
[45] Date of Patent: Nov. 10, 1998

[54] METHOD FOR CONTROLLING DAMPER CLUTCH OF AN AUTOMATIC TRASMISSION TO INCREASE ENGINE POWER

[75] Inventor: Sung-Hong Ghil, Seoul, Rep. of Korea

[73] Assignee: Hyundai Motor Co., Seoul, Rep. of Korea

[21] Appl. No.: 772,545

[22] Filed: Dec. 24, 1996

[30] Foreign Application Priority Data

Dec. 30, 1995 [KR] Rep. of Korea ................. 1995-68362

[51] Int. Cl.⁶ .................................................. F16H 61/14
[52] U.S. Cl. ........................... 477/169; 477/64; 477/174
[58] Field of Search ............................... 477/62, 63, 64, 477/166, 169, 174, 175, 176; 192/3.31

[56] References Cited

U.S. PATENT DOCUMENTS

| | | | |
|---|---|---|---|
| 4,510,747 | 4/1985 | Yoshida | 477/169 X |
| 4,535,652 | 8/1985 | Nishikawa et al. | 477/62 |
| 4,732,245 | 3/1988 | Hiramatsu | 477/169 |
| 4,744,269 | 5/1988 | Greene et al. | 477/64 |
| 5,050,717 | 9/1991 | Shibayama | 477/64 |
| 5,085,301 | 2/1992 | Imamura et al. | 477/169 |
| 5,219,055 | 6/1993 | Imamura | 477/62 X |
| 5,643,136 | 7/1997 | Kono et al. | 477/169 |

*Primary Examiner*—Khoi Q. Ta
*Attorney, Agent, or Firm*—Finnegan, Henderson, Farabow, Garrett & Dunner, L.L.P.

[57] ABSTRACT

A method for controlling a damper clutch when a vehicle having an automatic transmission requires increased power. For example, when accelerating while driving uphill, the present invention disengages a damper clutch. This advantage is obtained by identifying a power increase region on the damper clutch engaged region of operation such that the damper clutch is disengaged. The method for controlling the damper clutch includes a step of generating engine signal indicative of engine rpms and throttle position. A control signal is developing such that control of the damper clutch is based upon the generated engine signals.

7 Claims, 3 Drawing Sheets

METHOD FOR CONTROLLING DAMPER CLUTCH OF AN AUTOMATIC TRASMISSION TO INCREASE ENGINE POWER

BACKGROUND OF THE INVENTION

The present invention relates to a method for controlling a damper clutch, and more particularly, to a method for controlling a damper clutch when a vehicle with an automatic transmission requires more engine power.

BACKGROUND OF THE INVENTION

Generally, vehicles having manual transmission allow a driver to shift gears at will. Conversely, automatic transmissions automatically shift gears for the driver according to various driving conditions, such as, for example, vehicle speed.

An automatic transmission system comprising a torque convertor has, as an integral element, a damper clutch. Conventionally, controlling the damper clutch depends upon a relationship between engine rpms and the percentage a throttle valve is open.

FIG. 1 is a schematic diagram of an automatic transmission system. FIG. 2 is a view illustrating a structure of a torque convertor. FIG. 3 is a view illustrating an operational range of the prior art damper clutch.

Referring to FIG. 1, automatic transmission systems use a fluid medium to transmit motive power from an engine 1 through a gear system (not shown) of an automatic transmission 5. Automatic transmission 5, through the gear system, applies the engine power to a drive shaft (not shown) to rotate front and/or rear wheels 6.

Automatic transmission system 5 typically has a torque converter 2, an electronic control unit 16 for controlling the hydraulic pressure, a shift control device 4 (typically a part of the electronic control unit 16), and a planet gear set 3.

As shown in FIG. 2, torque converter 2, an essential element of the automatic transmission system, transmits the power from engine 1 to automatic transmission 5, thereby taking on flywheel functions of the manual transmission. Torque converter 2 absorbs sudden changes in torque (or engine power) both when the vehicle starts from a stopped state and when it accelerates (decelerates) from a moving state. Absorbing the changes in torque allows smooth driving.

Torque converter 2, internally filled with fluid, absorbs torque changes using a fluid medium. Energy created by the centrifugal force formed by the fluid allows torque converter 2 to smoothly transmit rotational force from engine 1 through transmission 5 to wheels 6. This also prevents shocks and/or vibrations caused by the twisting of a crank shaft.

In torque converter 2, a pump 10 transforms the rotational force of engine 1, as applied by shaft 8, into centrifugal force using the fluid (not shown) and transmits this energy to a turbine 7. Turbine 7 transmits the centrifugal force of the fluid from the pump 10 to an input shaft 11. A stator 12 changes the direction of the fluid coming out of turbine 7 to boost the torque.

Also, a damper clutch 9 is engaged along with turbine 7 within a fixed, predetermined operating range relating to engine rpms and a percentage open of an accelerator throttle (not shown). Damper clutch 9 improves fuel efficiency, but reduces engine power.

Damper clutch 9 improves fuel efficiency when it is engaged; however, it decrease the available engine power. Therefore, current technology limits when damper clutch 9 can be engaged. As shown in FIG. 3, the damper clutch is engaged only in a cruising range 13 of vehicle operation. In range 13, pump 10 and turbine 7 are engaged.

However, it has been discovered that when operating in cruising range 13, it is desirable to disengage damper clutch 9 to increase engine power. For example, when accelerating while traveling uphill in an automobile having the above conventional automatic transmission the damper clutch will be engaged. The accelerating power, thus, decreases as there is no increase in torque of torque converter 2. In other words, engine 1 and transmission 5 are directly connected at a 1:1 ratio, which results in a decrease in realized power. In other words, there are limitations in acceleration and limitations in the increase of engine rpms due to damper clutch 9 being engaged.

There has been ongoing research on how to better control the damper clutch so that an automatic transmission controls the damper clutch in ways more responsive to the needs of a driver. New control methods resulting from the above research indicate control shift timing is efficacious when driving on various road conditions, but when sudden driving maneuvers are made or when the driver depresses the brakes, then the prior art, and recent control, methods release all the damper clutches, there is the drawback of reduced power.

SUMMARY OF THE INVENTION

The advantages and purpose of this invention will be set forth in part from the description, or may be learned by practice of the invention. The advantages and purpose of the invention will be realized and attained by means of the elements and combinations particularly pointed out in the appended claims.

To obtain the advantages and in accordance with the purpose of the invention, as embodied and broadly described herein, the present invention provides improved methods for controlling a damper clutch that allows for increased acceleration power when driving in a cruising range and to prevent the losing of braking power when a driver suddenly applies brakes. To achieve the above object, the present invention provides a method for controlling a damper clutch of a vehicle. The method includes generating engine signals indicative of engine rpms and accelerator throttle position. The method then develops a control signal based on an engine signal indicating the engine is operating in at least one of a first operating range, second operating range, or third operating range where the third operating range corresponds to sudden changes in engine power

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE INVENTION

Figure 1:
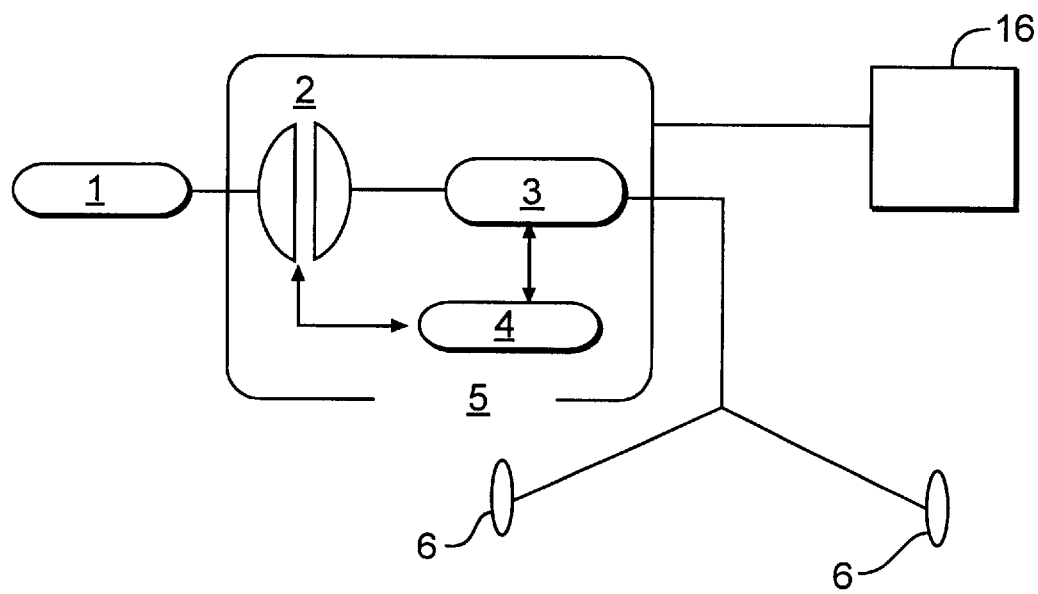
FIG. 1 is a structural view of an automatic transmission system.
Figure 2:
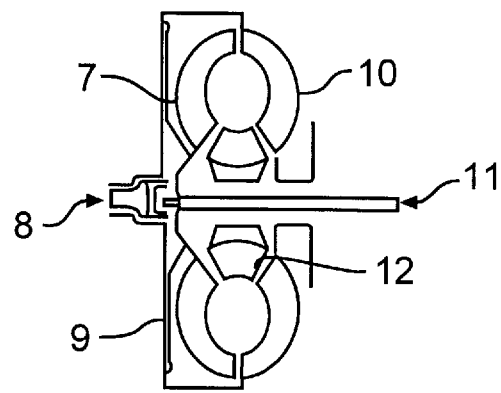
FIG. 2 is a view illustrating a structure of a torque convertor.
Figure 3:
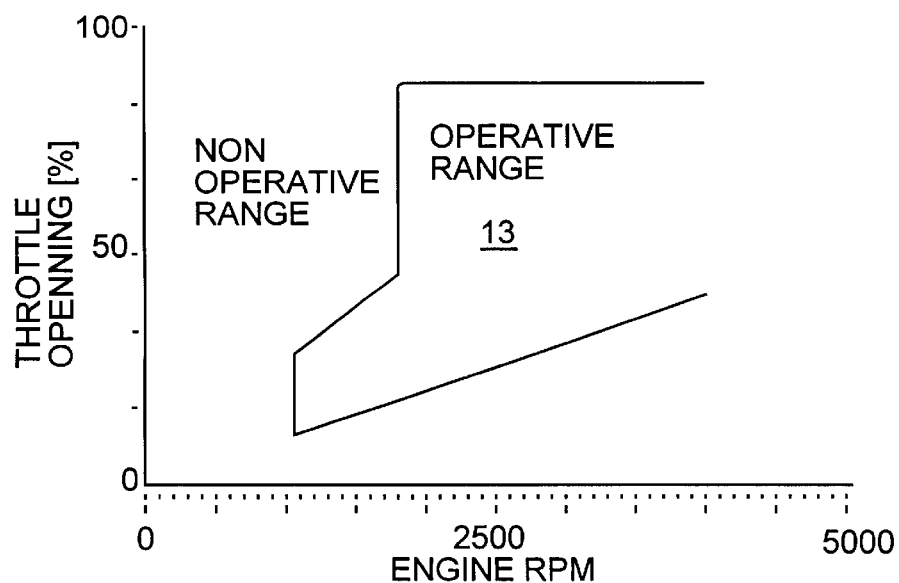
FIG. 3 is a view illustrating an operational range of the prior art damper clutch.
Figure 4:
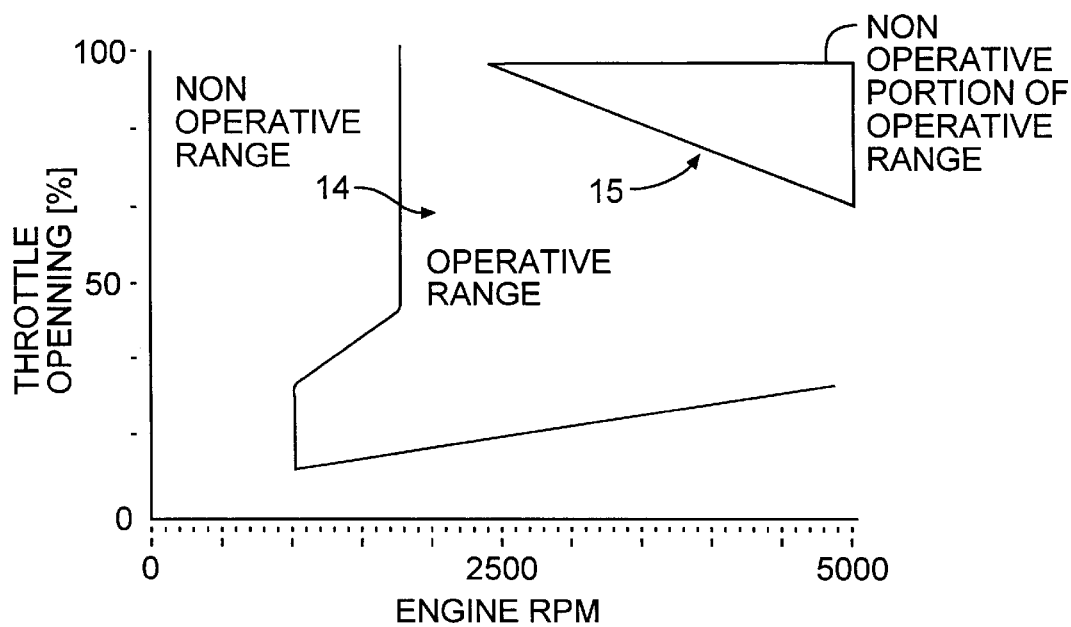
FIG. 4 is a view illustrating a range in which a damper clutch of the present invention when traveling uphill does not operate.

FIG. 4 shows a graphical representation of engine operating conditions that control when a damper clutch is engaged or disengaging. In the prior art, shown in FIG. 3, the damper clutch is engaged when a mapping of the percentage open position of the throttle and engine rpms indicates a point in range 14, FIG. 4—range 13 in FIG. 3. The present invention identifies a third range of operation, range 15, where the damper clutch should be disengaged. Testing has shown that vehicle operation is improved when the damper clutch is disengaged in range 15, which allows an increase in accelerator power. Thus, when operating in this range, the damper clutch is disengaged and when traveling, for example, uphill, the damper clutch is disengaged to prevent a decrease in acceleration power.

Figure 5:
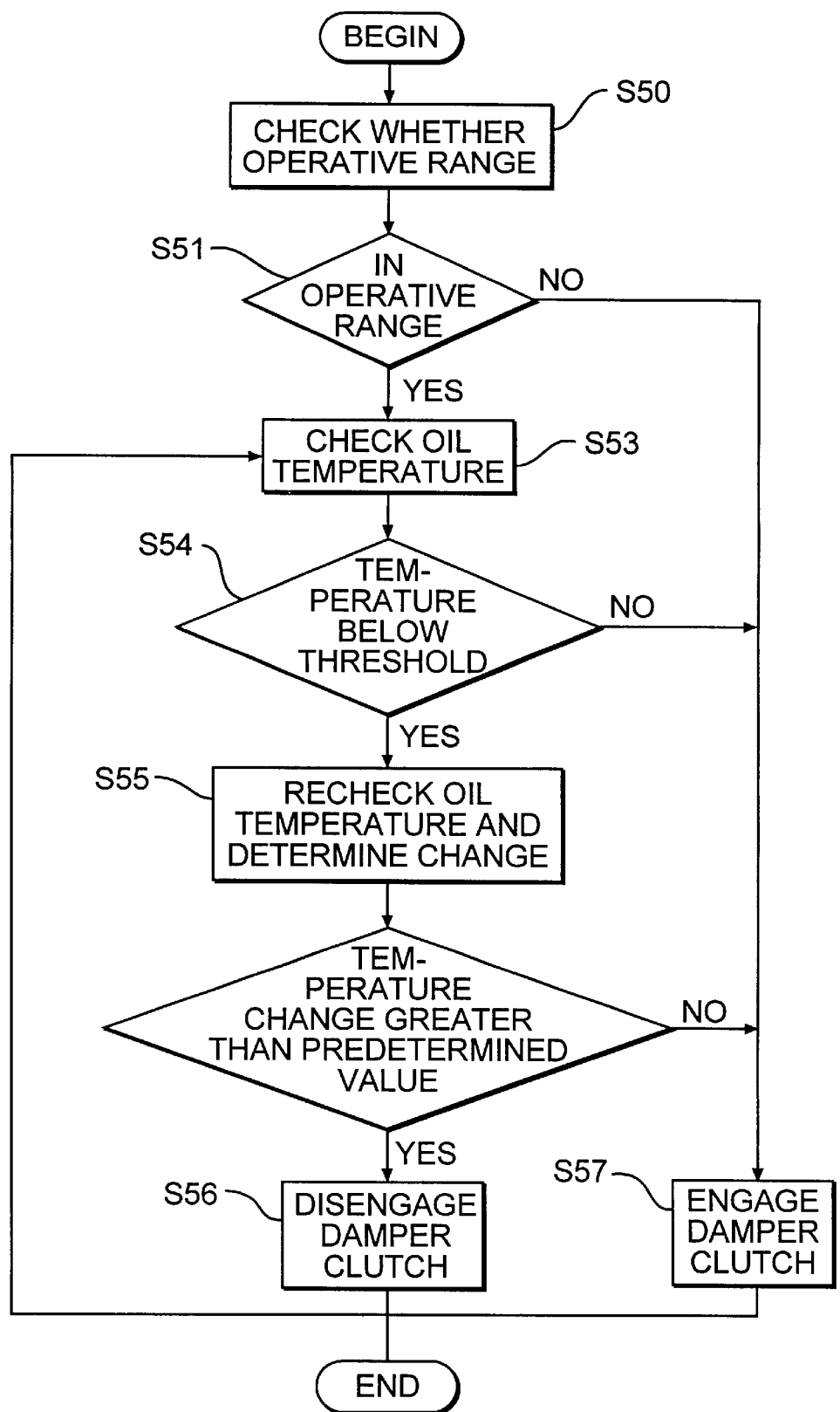
FIG. 5 is a flow chart of a damper clutch control method when driving uphill according to the present invention.

Referring to FIG. 5, in the automatic transmission system of the present invention, the method generates engine signals indicative of engine rpms and throttle opening, step S50. Next, it determines what operating range the engine is in and disengages the damper clutch based on whether the engine signal falls in a damper clutch non-operative range, step S51. If the engine signal falls within a damper clutch operative range, then the damper clutch is operated on the following conditions, step S52:

step S53: oil temperature is initially checked;

step S54: if the initial oil temperature is below a threshold value (105 degrees Celsius), then the damper clutch is engaged;

step S55: oil temperature is re-checked at predetermined intervals (every 3 seconds in the preferred embodiment);

step S56: if the change in oil temperature between checks is below a predetermined amount (5 degrees Celsius), then the damper clutch is engaged; and step S57: if the change in oil temperature between checks is above a predetermined amount (5 degrees Celsius), then the damper clutch is dis-engaged.

Oil temperature is added as an engine signal for it provides indication of the need for increased power. When driving, for example, uphill, oil temperature is greater then normal driving conditions oil temperature. Thus, the need for increased power is shown when oil temperature is higher than normal driving or changing quicker than normal driving.

Accordingly, in the damper clutch control method of the present invention, the problem of losing acceleration power when driving uphill is solved, and the drawback of prior art of losing braking power when suddenly applying the brakes is overcome.

While this invention has been described in connection with what is presently considered to be the most practical and preferred embodiment, it is to be understood that the invention is not limited to the disclosed embodiments, but, on the contrary, it is intended to cover various modifications and equivalent arrangements included within the spirit and scope of the appended claims.

What is claimed is:

1. A damper clutch control system for controlling a damper clutch of a vehicle, comprising:

a damper clutch for connecting a pump directly with a turbine in a torque converter; and control means for determining a nonoperative portion of an operative range based on engine signals indicative of RPM of an engine and openness of an accelerator throttle, the control means developing a control signal based on whether the engine signals indicate vehicle operation is in at least one of a first range corresponding to a damper clutch nonoperative range, a second range corresponding to the damper clutch operative range, and a third range corresponding to the damper clutch nonoperative portion of the operative range, wherein when the engine signals indicate the vehicle operation is in the third range, the control signal controls release of the damper clutch to increase available torque converting action of the torque converter.

2. The damper clutch control system of claim 1 wherein the engine signals, further indicate oil temperature.

3. A method of controlling a damper clutch of a vehicle, comprising the steps of:

generating engine signals indicative of RPM of an engine and openness of an accelerator throttle; and developing a control signal based on whether the engine signals indicate vehicle operation is in at least one of a first range corresponding to a damper clutch nonoperative range, a second range corresponding to the damper clutch operative range, and a third range corresponding to the damper clutch nonoperative portion of the operative range, wherein when the engine signals indicate the vehicle operation is in the third range, the control signal controls release of the damper clutch to increase available torque converting action of the torque converter.

4. A method of controlling a damper clutch of a vehicle as in claim 3, wherein the step of generating engine signals includes generating signals indicative of oil temperature.

5. A method of controlling a damper clutch of a vehicle as in claim 4, further comprising the steps of:

checking whether oil temperature is above a threshold value; and disengaging the damper clutch based on the result of said checking.

6. A method of controlling a damper clutch of a vehicle as in claim 4, further comprising the steps of:

checking the oil temperature at predetermined intervals;

calculating a change in the oil temperature over the predetermined intervals; and engaging or disengaging the damper clutch based on the result of said calculation.

7. A method of controlling a damper clutch of a vehicle as in claim 6, further comprising the step of checking whether the oil temperature is above a predetermined threshold value and disengaging the damper clutch based on the result of said checking.

* * * * *

UNITED STATES PATENT AND TRADEMARK OFFICE
CERTIFICATE OF CORRECTION

PATENT NO. : 5,833,579
DATED : November 10, 1998
INVENTOR(S) : Sung-Hong GHIL

It is certified that error appears in the above-indentified patent and that said Letters Patent is hereby corrected as shown below:

Title page, Item [54], in the Title, line 3, "TRASMISSION" should read --TRANSMISSION--.

Claim 2, col. 4, line 22, after "signals", delete ",".

Signed and Sealed this

Twenty-ninth Day of June, 1999

*Attest:*

Q. TODD DICKINSON

*Attesting Officer*        *Acting Commissioner of Patents and Trademarks*